No. 716,036. Patented Dec. 16, 1902.
A. HEIL.
HOT AIR MACHINE.
(Application filed Oct. 11, 1899.)
(No Model.)
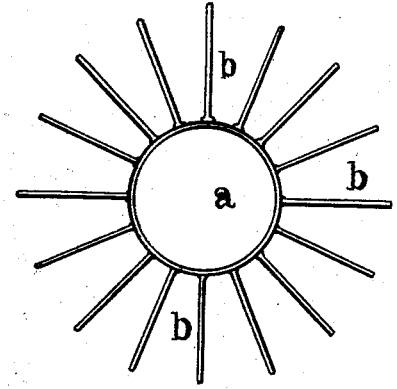
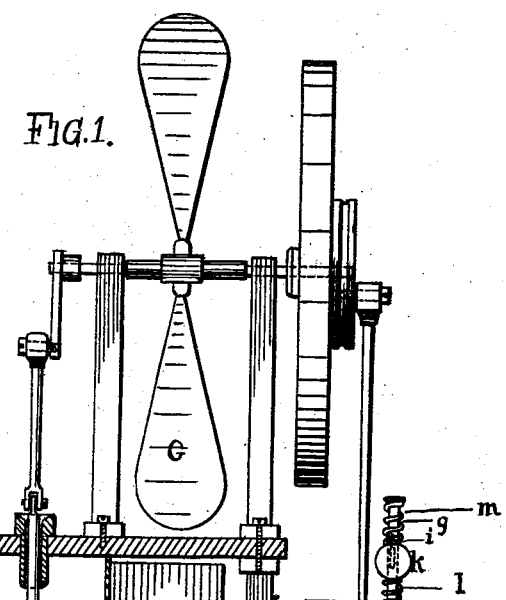
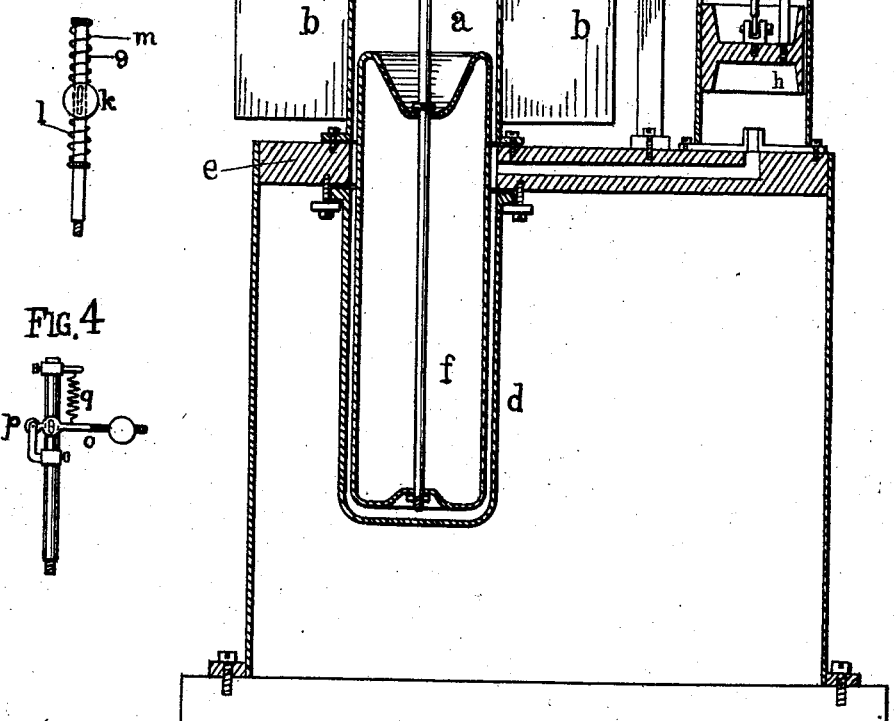
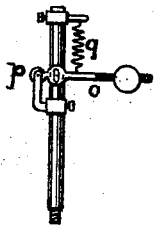
Witnesses
Inventor
Albrecht Heil

UNITED STATES PATENT OFFICE.

ALBRECHT HEIL, OF FRANKFORT-ON-THE-MAIN, GERMANY, ASSIGNOR TO A. WOLF, JR., & CO., OF FRANKFORT-ON-THE-MAIN, GERMANY, A FIRM.

HOT-AIR MACHINE.

SPECIFICATION forming part of Letters Patent No. 716,036, dated December 16, 1902.

Application filed October 11, 1899. Serial No. 733,298. (No model.)

*To all whom it may concern:*

Be it known that I, ALBRECHT HEIL, a subject of the Emperor of Germany, and a resident of Frankfort-on-the-Main, Germany, have invented certain new and useful Improvements in Hot-Air Machines, of which the following is a specification.

This invention relates to hot-air engines; and it has for its object to provide a motor in which very effective and complete cooling takes place and a great difference of temperature is maintained between the different parts of the displacing-cylinder.

In the accompanying drawings, Figure 1 represents in vertical section an apparatus constructed in accordance with this invention. Fig. 2 is a cross-section through the upper part of the displacing-cylinder. Figs. 3 and 4 show the governors or regulators separately, as hereinafter described.

In an engine constructed in accordance with this invention the upper part $a$ of the displacing-cylinder is provided with cooling-plates $b$, (preferably vertical and radial,) and at one side above these plates $b$ is arranged a ventilator-fan $c$, worked by the motor, the said ventilator-fan forcing cool air into the spaces between the plates $b$ while the motor is working, so that thereby the upper part of the cylinder $a$ is kept very cool. To obtain a further cooling of the upper part $a$ of the displacing-cylinder, the lower part $d$ thereof is made of porcelain or equivalent material and is secured to the under side of the base-plate $e$, the metallic upper part $a$ being secured to the upper side of the said base-plate, the consequence being that heat from the lower part $d$ is not conducted to the part $a$, so as to be detrimental to the working of the engine. The fact that the lower part $d$ is of porcelain or equivalent material and its isolation from the upper part permits of permanently heating the part $d$ to a far higher temperature than has been heretofore possible. The heating may, for example, be raised so as to attain even a white heat. A good effect may be, moreover, obtained if the displacer $f$ be likewise made of porcelain or like material, so that it is not liable to be injured by the intense heat and is less liable to convey heat to the upper part $a$ of the displacing-cylinder.

The aforesaid parts, which are described as being made of porcelain or the like, may be made of very thin sheet metal, the inside and outside of which are covered with enamel or the like capable of protecting the metal from corrosion and being a non-conductor of heat.

A hot-air motor constructed in this manner under otherwise equal conditions is of a very high efficiency.

In order that the working of the machine may always be kept as constant as possible, it may be fitted with a governor or regulator constructed in the following manner: A tube $g$, closed at the top, has its open bottom end screwed into an opening in the piston $h$, the interior of the said tube being in direct communication with the interior of the cylinder, as shown, and being provided with a slot $i$, over which a slider, shown as a ball $k$, is adapted to slide up and down on the tube $g$, the said slider being held between two springs $l$ and $m$, so that normally it will completely close the slot $i$, and the springs $l$ and $m$ are so strong that as long as the engine retains its normal speed the slider will retain this normal position. When the speed of the engine exceeds its normal limit, the slider $k$ is displaced by reason of the inertia overcoming the action of the springs, thus causing the slot $i$ to be uncovered, the consequence of which is that the interior of the cylinder is placed in communication with the outer air and that a partial equalization is produced, the effect of which is that the speed of the motor is reduced. Fig. 3 illustrates the said slider in the position in which the slot $i$ is completely covered, while in Fig. 1 the slider is shown in the position in which the upper part of the slot is opened.

In order to impart to the governor or regulator a great sensitiveness, the construction represented in Fig. 4 may be used.

The lever $o$ carries a weight (shown in the form of a ball) and is centered at $p$ and is so balanced by a spring $q$ that the widened part of the lever situated upon the slot in the tube covers the slot when the engine is working at normal speed. When the speed of the engine increases, the lever *o* moves, so that the portion of the lever which covers the slot will slide away from over the slot to a corresponding extent and place the interior of the cylinder in communication with the outer air, as in the first-described arrangement.

I do not herein claim, specifically, the regulator or governor described and shown.

Having now particularly described and ascertained the nature of my said invention and in what manner the same is to be performed, I declare that what I claim is—

1. In a hot-air engine, a displacement-cylinder the upper portion of which is of metal and the lower portion of porcelain, the two portions being united to the opposite sides of a base-piece, substantially as described.

2. In a hot-air engine, a displacement-cylinder, the upper portion of which is of metal and the lower portion of porcelain, the two portions being united to the opposite sides of a base-plate, and a displacer of porcelain, substantially as described.

3. In a hot-air engine, the combination of a displacement-cylinder made in two separate portions, one of which is metal and the other of porcelain, a porcelain displacer, radial vertical plates on the outside of the metal portion of the cylinder, and a fan arranged above the plates to force air between the same, substantially as described.

In testimony whereof I have signed my name to this specification in the presence of two subscribing witnesses.

ALBRECHT HEIL.

Witnesses:
FRANZ HASSLACHER,
HERMANN JACK.